United States Patent [19]
Emery et al.

[11] Patent Number: 5,727,057
[45] Date of Patent: Mar. 10, 1998

[54] STORAGE, TRANSMISSION, COMMUNICATION AND ACCESS TO GEOGRAPHICAL POSITIONING DATA LINKED WITH STANDARD TELEPHONY NUMBERING AND ENCODED FOR USE IN TELECOMMUNICATIONS AND RELATED SERVICES

[75] Inventors: Mark Emery; Zaman Gulzar, both of Phoenix, Ariz.

[73] Assignee: AG Communication Systems Corporation, Phoenix, Ariz.

[21] Appl. No.: 363,847

[22] Filed: Dec. 27, 1994

[51] Int. Cl.[6] .............. H04M 3/42; H04M 3/22; H04M 7/00; H04M 3/00
[52] U.S. Cl. .............. 379/211; 379/16; 379/212; 379/230; 379/246; 455/406; 455/456
[58] Field of Search .............. 379/16, 58, 59, 379/60, 61, 63, 207, 211, 229, 230, 246, 247, 210, 212; 455/406, 456

[56] References Cited

U.S. PATENT DOCUMENTS 4,464,543  8/1984  Kline et al. .............. 379/247 X
5,303,297  4/1994  Hillis .............. 379/111 X Primary Examiner—Harry S. Hong
Attorney, Agent, or Firm—Gregory G. Hendricks

[57] ABSTRACT

A method and system implementation for combining and accessing telephony numbering and geographical position so direct access to information, services and goods may be invoked through the use of various telephone networks. The existing telephone networks throughout North America and the world use standardized numbering plans for connecting to, or switching any subtended device to any other device within the network. The U.S. government has orbited a series of communication satellites which provide a signaling method for determining precise geographical location throughout the world. This system is called the Global Positioning System (GPS) and provides several levels of service. Each GPS satellite continually transmits a navigation location signal which may be received on the ground, sea, or in the air and when combined with signals from other GPS satellites used to pinpoint navigational position in two or three dimensions. This invention allows for the storage, transmission, communication, and access to geographical positioning data determined by GPS or any other method by using the North American or other land based public switched, cellular, satellite, radio, or other telephone system and related intelligent networks.

9 Claims, 13 Drawing Sheets

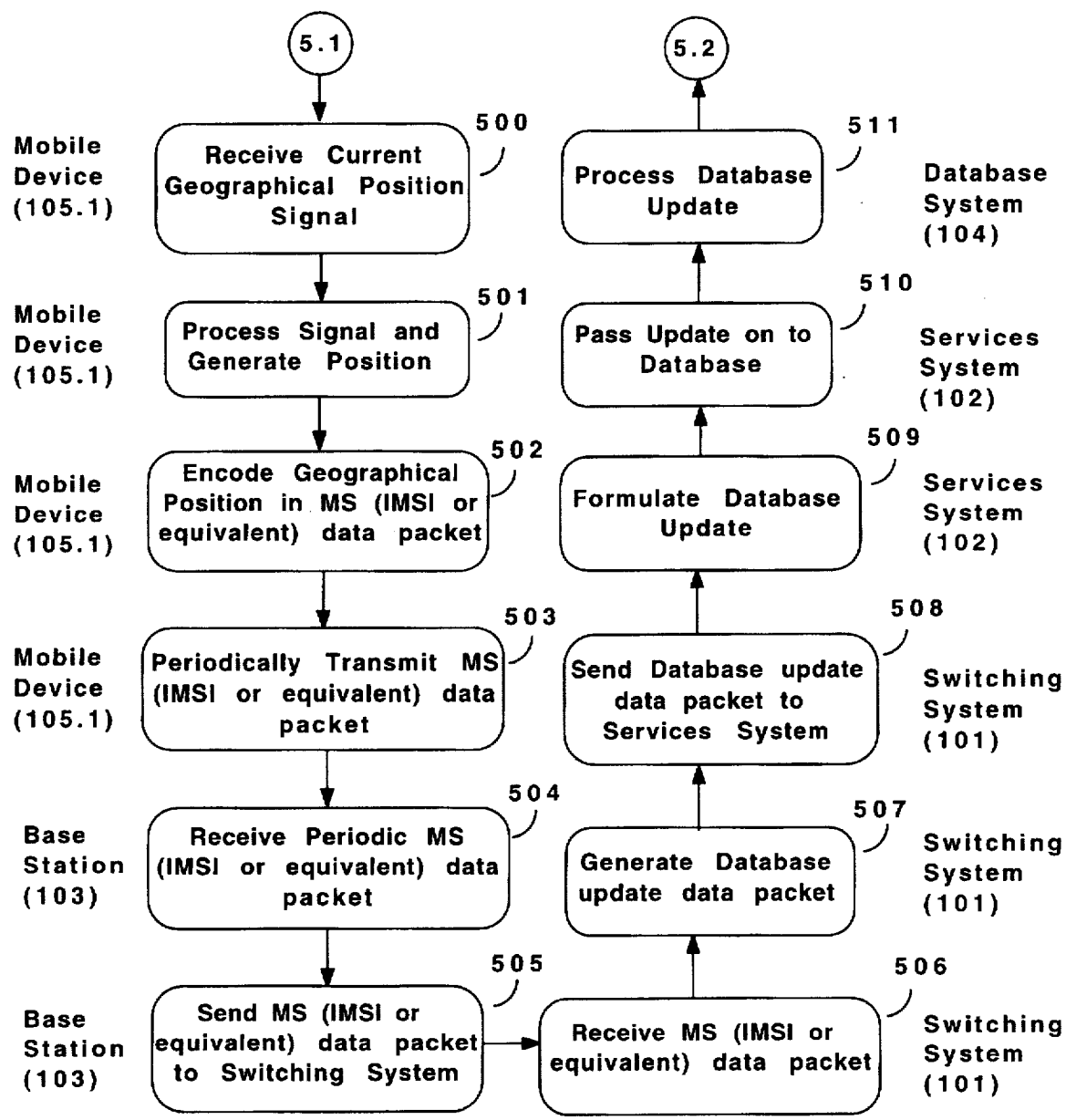

STORAGE, TRANSMISSION, COMMUNICATION AND ACCESS TO GEOGRAPHICAL POSITIONING DATA LINKED WITH STANDARD TELEPHONY NUMBERING AND ENCODED FOR USE IN TELECOMMUNICATIONS AND RELATED SERVICES

FIELD OF THE INVENTION

The existing Public Switched Telephone Network (PSTN) and Cellular (or other radio based) Telephone Network (CTN) provide switched voice and data communications between designated parties. The network has evolved over the last 100 years from simple hardwired connections to complex delivery of hardware and software based capabilities which provide significant information handling and delivery functions. Communication between any two or more parties has been governed by the use of standardized telephone numbering plans (example: North American Numbering Plan). Hence, any particular telephone or telephony device can be linked into the network as a terminator or originator based upon its unique Telephone ID or Directory Number (DN). In a similar vein, geographical positions (or Location IDs) of mobile or fixed telephone devices can now be universally and economically determined, for example, via the Global Positioning System (GPS). The inventions herein extend the state-of-the-art by combining the ubiquitous Telephone ID with the ubiquitous Location ID, combining them into the telephone reference ID, placing them into the PSTN in a dynamic fashion, and providing access and update methods to them and, therefore, to any other relatable data.

BACKGROUND OF THE INVENTION

Historically, users of the PSTN or other telephony systems have used the system to locate products, services, or people. This occurred through the use of lookup in a phone book or some data repository (on-line database, directory assistance, etc.) where a phone number was related to the name of a person, place, or thing, and which in turn were geographically linked (via a map) to a place referenced by name and/or address. The fundamental need to make queries of this nature has driven the generation, support, and commercialization of a wide variety of support systems. With the advent of precise geographical positioning systems, such as GPS or Position Information Navigation Subsystem (PINS), the technological basis for automating and enhancing much of the "location" portion of queries like those above is available. Since the various PSTNs provide service in a reliable, widely available, and generally uniform method, the opportunity exists to incorporate geographical information into telephone systems and subsequently provide the means, protocols, and methods for updating, accessing and using that information, and related product or service information resolved from the various telephony Databases. In the databases of the existing PSTN implementations various generalized means are used to ascertain equipage and service parameters for each and every DN. In general, each DN has database entries which include information about the type of line, the signalling used on the line, special services for the line, and administrative information about the address of the line, the billing address, special billing parameters, etc. All of this information is available by reference to the DN. During various steps in call processing, database information (subtended from the switching system or services system) is accessed and together with direct user input (taking a phone off-hook, pressing digits on a keypad, etc.) cause specific call processing algorithms to be invoked. For instance, if a database entry contains a classmark for call waiting, and a call comes into the switch for that entry while the line is busy, the switch invokes software and hardware functions which keep the first call active, put a special audible tone on the line while the first call is active, and allow the user to pick up the second call by a brief depression of the hook switch, etc., etc. The generalized means for this feature validation, enaction, and processing are unique to each switching implementation, but are referenced throughout the following description when similar actions need to be accomplished.

SUMMARY OF THE INVENTION

The method and system architecture for storage, transmission, communication, and access to geographical positioning data linked into the PSTN and other telephony systems explained in the present invention overcomes the problems and limitations of the existing methods for obtaining like information. Within the PSTN, the Location ID in the designated or similar format and protocol of each stationary phone is placed into the Databases at the Switching System or Services System and updated as part of the normal subscriber Operations, Administration, Maintenance and Provisioning activities.

Within the radio based (cellular or other) telephone networks, the Location ID is transmitted as part of the periodic in-band control channel "keep-alive" or equivalent signal from mobile telephony devices, and then relayed from the base station or communications satellite through the Switching System and/or Services System and subsequently into the appropriate Database. In either of the above scenarios, access services are then provided to various subscribers which allow them to query and receive the Location ID of any particular Telephone ID related database entry. Additionally, other related services (product or service information, operations information, etc.) may be delivered in one of several communications methods and accessible through database queries based upon the Telephone ID, Location ID, or a combination thereof. The embodiment of the Location ID capturing mechanism (GPS, PINS, Time Difference of Arrival (TDOA), radio triangulation etc.) can be within any stationary wireline or radio based (cellular or other) handset, Personal Digital Assistant (PDA), computer, etc., or vehicle set, and that information can be incorporated into the existing in-band control channel information or equivalent signalling method.

BRIEF DESCRIPTION OF THE DRAWINGS

FIGS. 5 and 5B are flowcharts of the operational steps in updating the geographical data within the confines of the PSTN by use of cellular or other radio based interfacing devices having subtended geographical position determining devices.

DESCRIPTION OF THE PREFERRED EMBODIMENT

Figure 1:
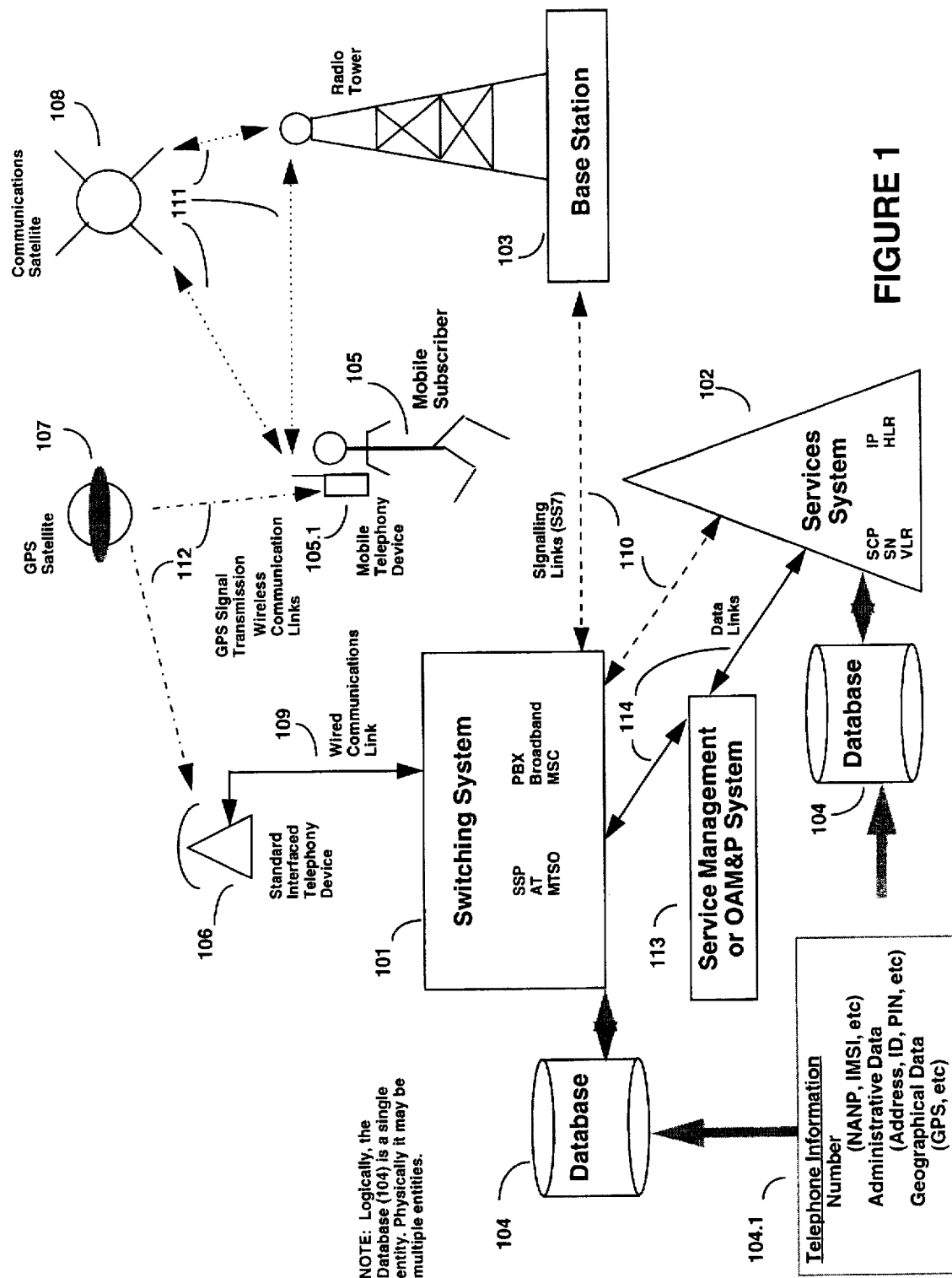
FIG. 1 is a diagram showing the architecture and system implementation of the invention within the extended PSTN. It includes data repositories for existing telephony data and additional geographical data (Location IDs). This figure also diagrammatically represents information and data flow between the various involved devices and systems.

The detailed description refers directly to the drawings included herein. Firstly, FIG. 1 depicts the system architecture, system implementation, and methods. Switching System 101 refers to a system used to connect any telephony device to another telephony device or group of devices and includes any of: Service Switching Point (SSP), Private Branch Exchange (PBX), Central Office (CO), Mobile Switching Center (MSC), Mobile Telephone Switching Office (MTSO), broadband switches, Private Access Branch Exchange (PABX) or other like systems. Services System 102 is a centralized control point and database with processing capability which is linked into the telephone network using a standard Signalling Link 110 like Signalling System 7 (SS7), etc., and standard signalling protocols (SCCP, MTP, OMAP, TCAP, ISUP, LAPD, etc.) which in turn support a variety of special information delivery needs. Examples of Services Systems include: Service Control Point (SCP), Service Node (SN), Intelligent Peripheral (IP), Home Location Register (HLR), and Visitor Location Register (VLR). Subtended from Services Systems 102 and/or Switching Systems 101 are Databases 104 which contain information 104.1 about individual subscriber telephone accounts (name, directory number, Personal Identification Number (PIN), address, types of services, billing information, etc.), routing information for making connections between end-user telephony or like devices, and equipment descriptions. These Databases are queried or accessible during the servicing of each call, may include VLR, HLR, Automatic Location Identification (ALI), Billing, or other switching or services databases, are realtime and distributed in nature, and are updatable and maintainable using various Service Management Systems (SMS) or Operations, Administration, Maintenance, and Provisioning (OAM&P) systems 113 over a variety of standardized or proprietary Data Links 114. The inclusion of a geographical location identifier (Location ID) in any one of a variety of encoded formats into these Databases and which is linked and keyed to Telephone ID or DN allows for numerous new service capabilities based upon query searches governed by the telephone number, DN, Location ID, or any information linked to the various subscriber database records.

Standard Interfaced Telephony Devices 106 like phones, modems, ISDN terminals, etc., communicate with Switching Systems 101 over wired links using a variety of standardized protocols (Dial Pulse (DP), Dual Tone Multi-Frequency (DTMF), Multi-Frequency (MF), Integrated Services Data Network (ISDN), Analog Display Services Interface (ADSI), etc.). These devices have relatively fixed geographical identifiers, so in instances where they are not capable of determining and/or transmitting their Location ID, a Database 104 query is implemented as part of the call processing to ascertain their position. Mobile subscribers 105 use mobile phones/devices 105.1 in a variety of mobile conveyances including: personal movement, planes, trains, automobiles, boats, etc.. These devices all communicate via a variety of methods over radio frequencies, through Communications Satellites 108 or directly to Radio Towers and subsequently to Base Station Systems 103. In the instance of a cellular or other radio based device, where Location ID is available to the device (for example by the use of a GPS/PINS receiver linked to the device as in 105.1 (FIG. 1) or 213 (FIG. 2)), the geographic location identifier information is captured by the device, bit encoded, possibly encrypted, imbedded into one of the standard polling or call messages, and thereafter transmitted into the network by the Telephone Transceiver 209 (FIG. 2) via the Base Station 103 and Signalling Links 110.

There are many potential ways of encoding the geographic location identifier, but nominally, 64-bits which numerically represent any point in a Cartesian Coordinate system (X-latitude, Y-longitude, Z-altitude) are used to encode the Location ID within the telephony device, during transmission between network elements 101, 102, 103, 105.1, 106, 108, 113, across Wired Communications Links 109, Wireless Communication Links 111, Signalling Links 110, and Data. Links 114, and within the telephony Database 104. Since the Location ID may be imbedded in other polling or call messages, during those instances (ADSI, etc.) it is expected that error checking (checksum, etc.) will be performed on the surrounding data packet. A simple example for encoding geographic position at the degree, minute, second, hexisecond into 64 bits with 14 spare bits for future growth or for altitude encoding is as follows:

| Latitude: | bit | 0 | North = 1, South = 0 |
|---|---|---|---|
| | bits | 1–8 | degrees (0–179) |
| | bits | 9–14 | minutes (0–59) |
| | bits | 15–20 | seconds (0–59) |
| | bits | 21–24 | hexiseconds (0–15) or spare |
| Longitude: | bit | 25 | West = 1, East = 0 |
| | bits | 26–33 | degrees (0–179) |
| | bits | 34–39 | minutes (0–59) |
| | bits | 40–45 | seconds (0–59) |
| | bits | 46–49 | hexiseconds (0–15) or spare |
| Spares/Altitude: | bits | 50–63 | Altitude-meters (0–16,383) |

Example: 39 degrees, 13 minutes, 12 seconds, 8 hexiseconds North and 8 degrees, 25 minutes, 18 seconds, 5 hexiseconds West in decimal equates to:

| 0391312081 | Latitude |
|---|---|
| 1752F2D1 (IN HEX) | |
| 0082518051 | Longitude |
| 04E62023 (IN HEX) | |

The Location ID will be used for additional Database queries associated with telephone identifiers, so it is a keyed and/or indexed field within the Databases (104). In addition, the Location ID provides a simple ubiquitous delivery reference and may be bar coded for use in mail and delivery systems by performing a database lookup as above which references the Location ID to a street address and provides a Telephone ID (DN) for delivery verification and/or notification. A simple bar code for the example above is the binary representation of the Location ID.

0001011101010010111001011010001 (latitude)
0000010011100110001000000100011 (longitude)

This bar code representation, along with a customer ID and service type also placed in a bar code representation, allows for the delivery of a specific package to a specific location and the generation of billing information hack to the originating customer ID. To generate a "delivery label" like that noted shove, for example with a computer, ADSI interface, and some label/printing software, a call may he made to the PSTN (similar to FIG. 4), the Location ID may he captured, a record comprising Location ID, Customer ID, Phone Number, Service Type, etc. may be built by the software, translated into a bar code (binary format), and sent to a printer, thermal device, etc. to make a bar code type label for an envelope, package, etc.

The geographic location identifier can be updated in two ways:

1. Manually: via the provisioning system 113, Switching System 101, or Services System 102
2. Automatically: by the subscriber's Telephony Device 105.1, 106, via the Switching System 101 or Services System 102.

Manual update for the geographic location identifier may be used for all types of telephony devices, but is primarily used for fixed line telephony devices and occurs during service initiation, service transportation, service modification, or during initial Database evolution to add the geographic location identifier. The Location ID field in the Database 104 is populated by using a variety of database evolution tools initiated from the provisioning system 113, Switching System 101, or Services System 102. During service initiation, service modification, and service transportation, a Location ID is entered manually, or automatically via geographic position to street address conversion software update routines for every PSTN telephony device.

Figure 3:
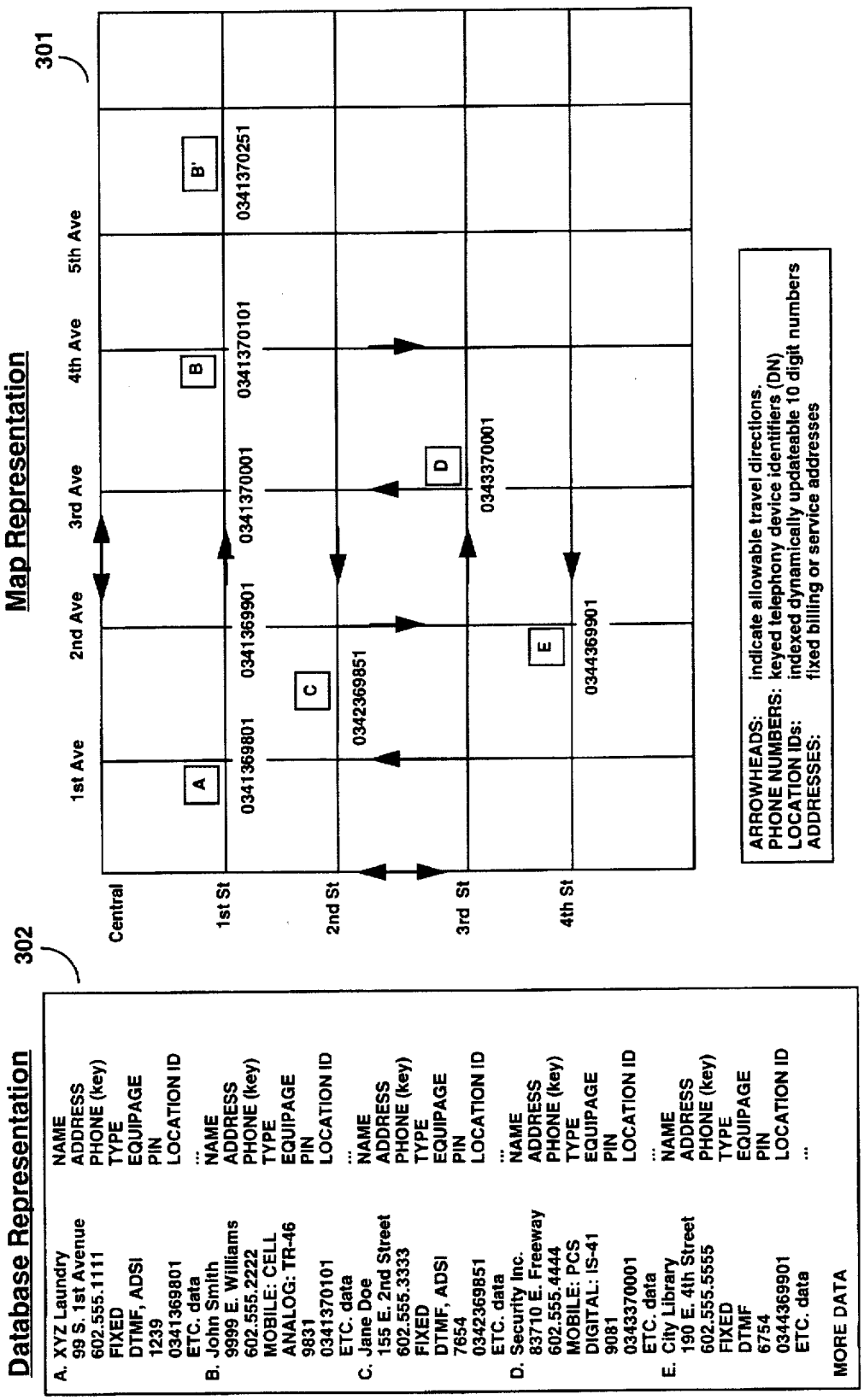
FIG. 3 is a diagrammatic representation mapping the geographic positioning identifier to a street map, and a generalized representation of the data in a telephony Database.
Figure 4A:
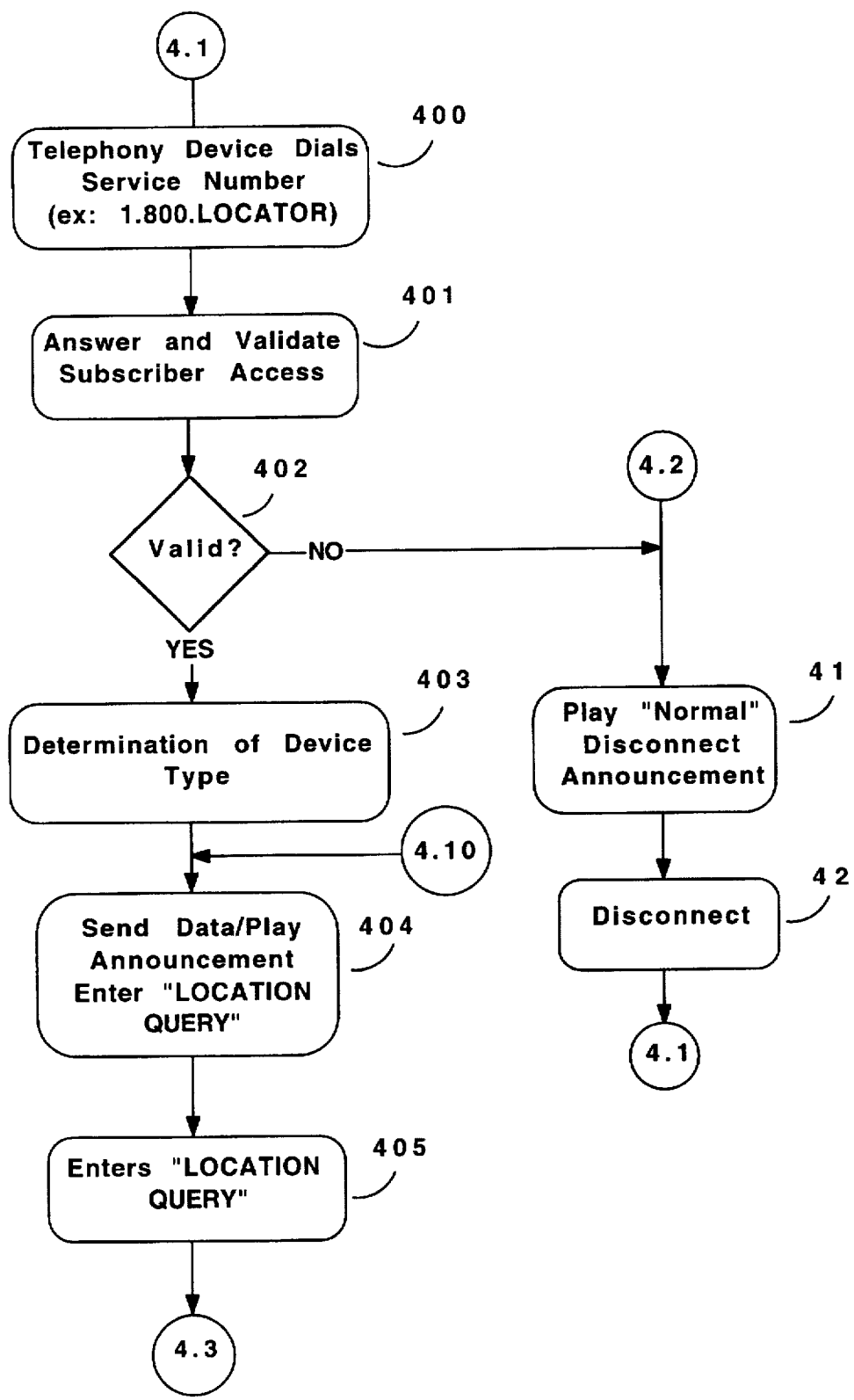
FIGS. 4A–4D are flowcharts of the operational steps in accessing the geographical data within the confines of the PSTN or other telephony networks by use of wired, cellular, or other radio based interfacing devices with or without subtended geographical position determining devices.
Figure 4B:
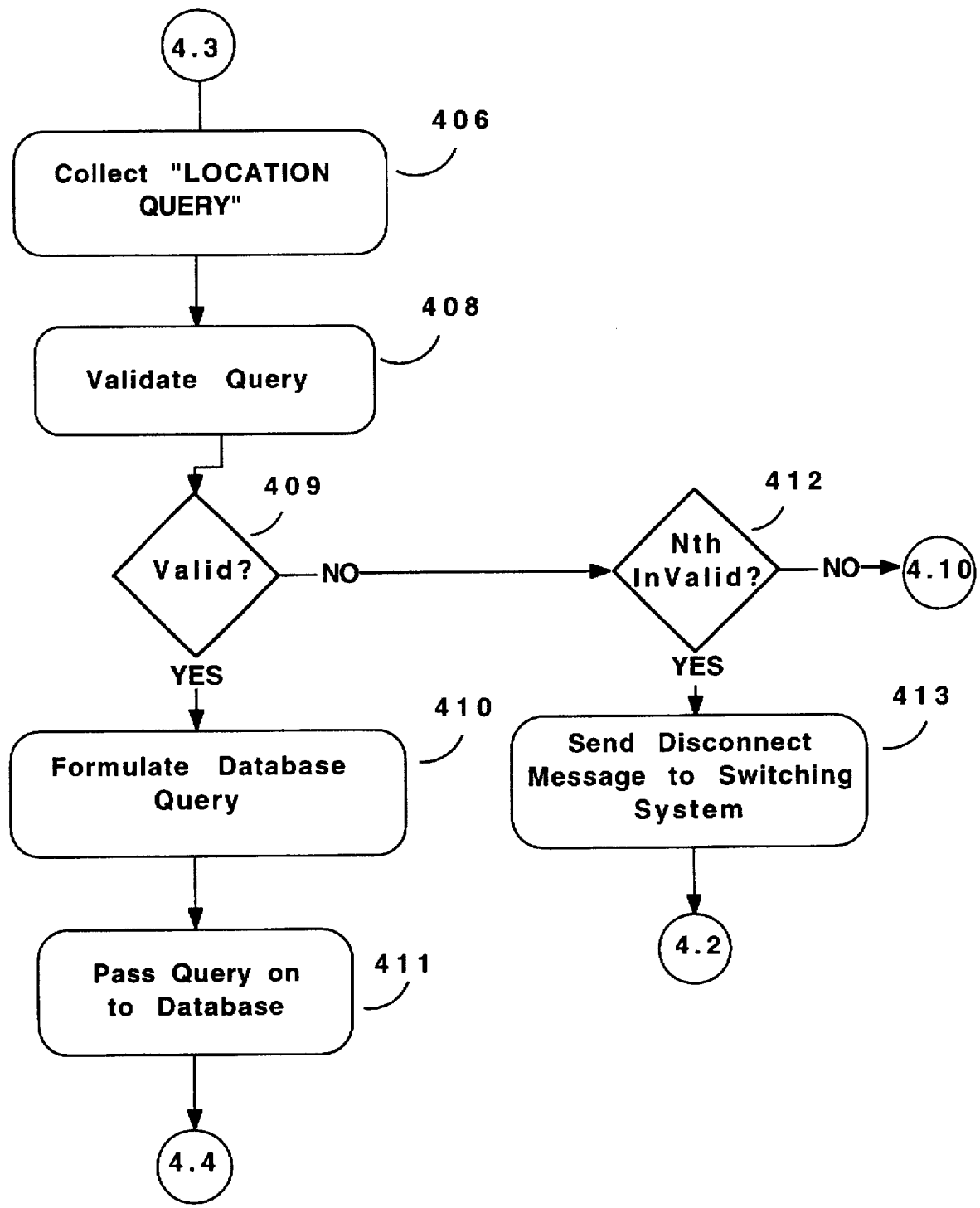
Figure 4C:
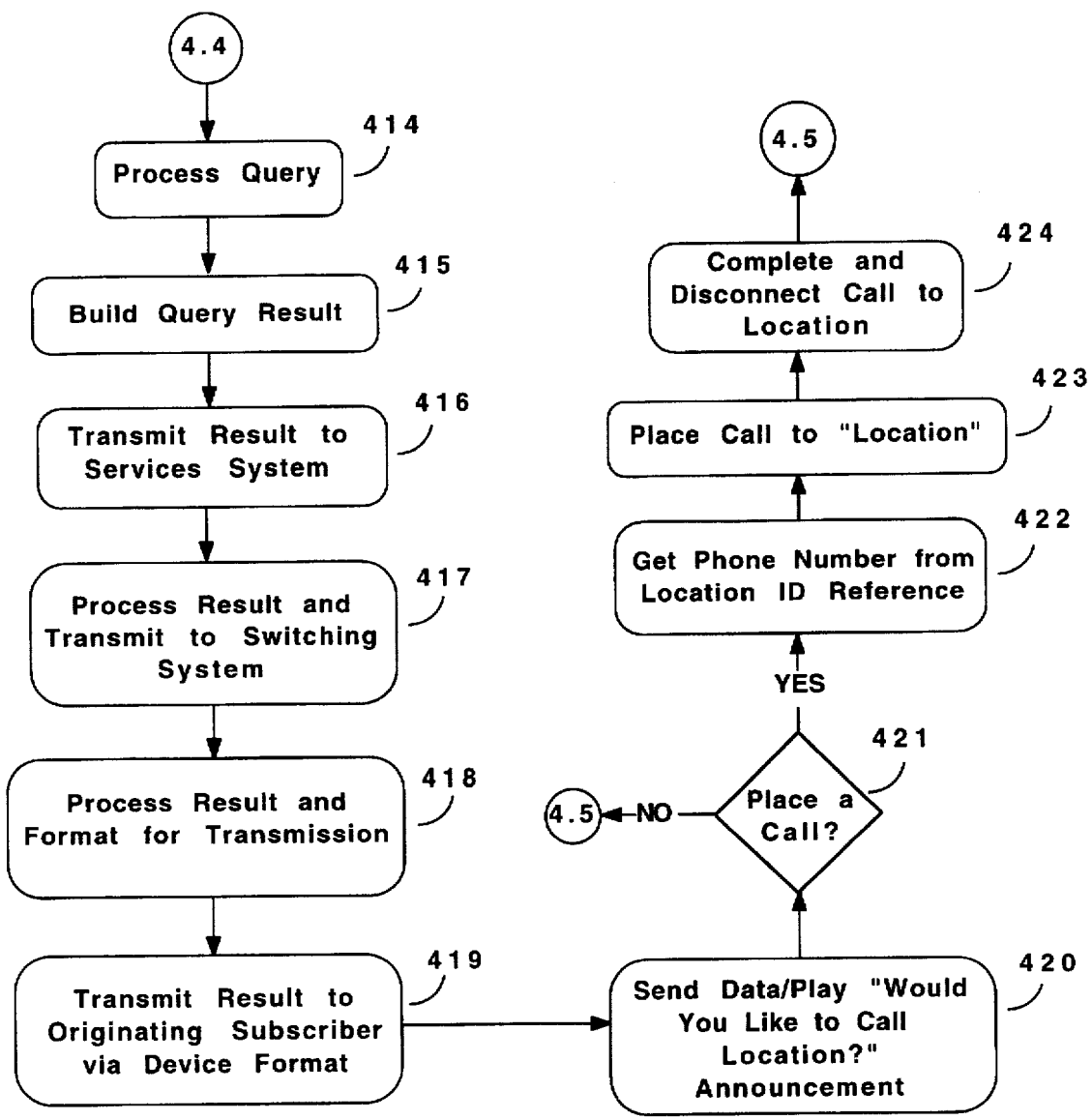
Figure 4D:
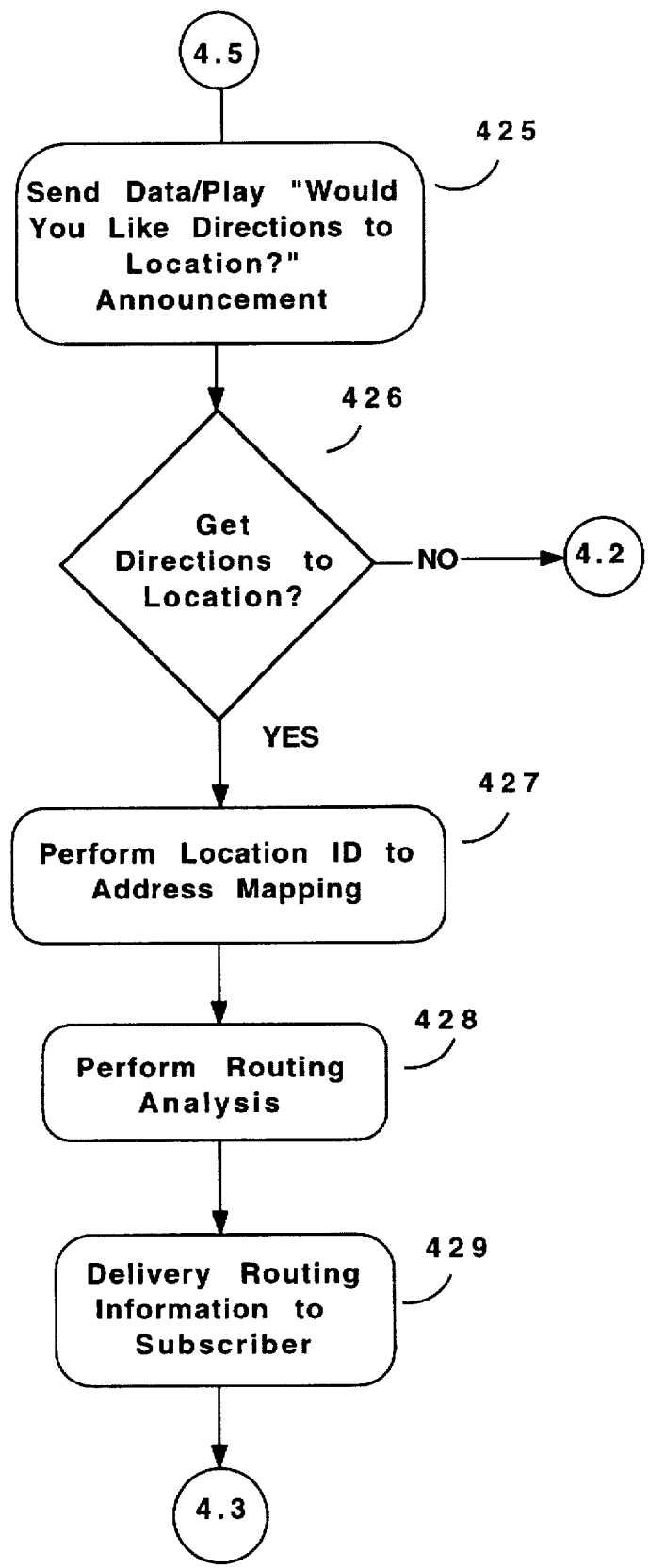

The Location ID is derived from mapping geographic positioning data equivalent to the coordinate system noted above to the street address of the telephone interface box. FIG. 3 depicts just such a mapping. Referring to FIG. 3, under Database Representation 302, which is part of the Database 104, in example (A) the Telephone ID (DN) for the XYZ laundry located at 99 S 1st Avenue is 602.555.1111 and the Location ID for that address is 0341369801. By mapping those two pieces of data, a data input is made into the Database 104 which makes reference to 0341369801 with the establishment's telephone number 602.555.1111. For PBX and other business users, the Location ID is registered for each of the telephone numbers listed by the business with the telephone service provider.

For mobile subscribers there are three additional methods of capturing and delivering the Location ID: transmission, polling, or calculation. The Location ID is stored by the Mobile Switching Center (MSC) in its Database 104, including local database, database server, HLR and VLR. The Location ID is updated periodically (every n seconds), or at the time call setup or call handover occurs. For periodic updates the interval can be adjusted in order to compensate for mobile subscribers that are not as mobile, or depending on the mode and communications dynamics of the mobile device (TR-46, IS-41, IS-54, IS-94, IS-95, ADC, JDC, GSM). Each of the three methods of capturing and delivering Location ID are described below and make reference to FIGS. 1 and 2:

1. Transmission: Depending on the location update policy (periodic "keep alive" or during call setup and handover), the Mobile Telephony Device 105.1 acquires the location ID from the GPS/PINS Receiver 213 or other geographic positioning device, sends the captured information through the Device Interface and Driver 207 to the Message Processor and Router 206, and thence to the device's Function Processor 204 which translates the information into the Location ID format and then routes the Location ID back out through the Message Processor 206 which places the Location ID into a message packet appropriate for the type of telephony device, and routes it to the Telephone Interface 210 via the Device Interface 207. The Telephone Interface captures the Location ID and places it into the telephone's data buffer for use via in-band control channel signalling (in the mobile to base time slot as data, Slow Associated Control Channel (SACCH) or Fast Associated Control Channel (FACCH)) in the appropriate format (TR-46, IS-41, IS-54, IS-94, IS-95, ADC, JDC, GSM, etc.) during the next timed, event-driven, or polled data or call transmission.

When one of those transmission events occurs, the Telephone Transceiver 209 transmits Location ID to the Base Station 103 or Communications Satellite 108 along with other Mobile Subscriber data in the appropriate format. Upon receiving the data from the Base Station 103, the Switching System 101 updates its Database 104 (or any other subtending database VLR, HLR, etc.) with the new Location ID. Making reference to FIG. 3, under the above scenario, using example (B) under Database Representation 302, at time $T_0$ John Smith's mobile phone transmits location 0341370101 from location B on the Map Representation 301. This information upon capture by the system is updated in the various telephony Databases 104. Later in time at $T_1$, during the "keep-alive" or call messages, as John's phone moves to location B', the phone transmits 0341370251 which will be updated in the various telephony Databases as the new Location ID.

When the periodic "keep-alive" transmission from the telephony device is received by the Switching System 101, and in the event that the telephony device is not capable of capturing geographic positioning information, the Switching System 101 or Services System 102 will perform a Database 104 query on the Base Station cell site to find out the cell site's (fixed) location, and then places that data into the Database 104 as the telephony device's (approximated) Location ID.

2. Polling: The Switching System 101 sends a locate message via the Base Station 103 or Communications Satellite 108 to every mobile subscriber Telephony Device 105.1 that is registered in the Switching System's Database 104. The mobile subscriber Telephony Device 105.1, acquires the geographic location identifier (as in section 1. above) from the GPS/PINS or other geographic positioning device, transmits it (as in section 1. above), and then the updated Location ID is stored in the system and Database(s) as in section 1. above. Polling may also be invoked from the switching system on a single DN (IMSI) basis. In the instance noted above, the transmission of the data is in a "quiet" mode (the phone's user/owner is not informed), but it requires the device to be powered up.

3. Calculation: The Location ID may be calculated by the Switching System. This calculation is primarily based on the signal strength or signal delay of a mobile subscriber device that is received by several triangulating Base Stations (fixed geographic position) and is covered in several other patents. In this method, other variables that are included in the calculation are: type of mobile device, power of the device, weather conditions etc. In any event, after the calculation is completed, as in both of the methods above, the Switching System 101 updates the new Location ID in its Database 104 and any subtending Databases. A variation on this method is to use TDOA in the handset to calculate its own position.

In addition to updating the geographic location identifier in order to track a mobile subscriber, the Location ID is also stored as an historical record whenever a mobile subscriber originates or terminates (answers) a telephone call. This Location ID is stored as an entry in the billing database, and may be used for billing, fraud detection and from-where-calling-services.

Calling Number Delivery (CND) services are currently available. An existing telephony service displays the calling party identity information to a subscriber of the service. Generally, this information is the DN of the calling telephone (Calling Number Delivery), and in the extended format includes the name that is registered for the particular DN. However, in the present invention the calling party identity information is enhanced to include the Location ID of the caller and the called party.

Typically, a telephony message contains the Automatic Number Identification (ANI) or Calling Line Identification (CLI). In the present invention ANI and CLI are expanded so the Location ID of the caller is also included in these messages. For the Calling Line Identification Telephone Service, the ANI or CLI is used to query a database to retrieve the callers registered name. With the Location ID enhancement, the location of the caller is also queried and then transmitted to the called party. Using the same Frequency Shift Keying (FSK) delivery mechanisms (Single Data Message Format or Multiple Data Message Format) as Calling Number, Calling Name, or outbound ADSI, the terminating switch 101 for a call determines if Location ID can be disclosed by making a database query 104. If the data is disclosable, it fetches and inserts the Location ID for both the originating party and the terminating party, inserts it in the FSK data stream and transmits it during the ringing cadence or during the data transmission cycle (ADSI). If the data for the originating party is not disclosable, the switch makes the overall call data determination shown below, inserts the correct calling party indication and then delivers it as above:

| CALLER DELIVERY | |
|---|---|
| Calling Number | Available |
| Calling Name | Available |
| Location ID | Available |
| Indication | Name & Number sent, Location sent |
| CALLING NUMBER/NAME DELIVERY | |
| Calling Number | Available |
| Calling Name | Available |
| Location ID | Blocked, not available |
| Indication | Name & Number sent, Private Location |
| CALLING LOCATION DELIVERY | |
| Calling Number | Blocked |
| Calling Name | Blocked |
| Location ID | Available |
| Indication | Private Call, Location sent |
| BLOCKED CALLER DELIVERY | |
| Calling Number | Blocked |
| Calling Name | Blocked |
| Location ID | Blocked |
| Indication | Private |

Since the Location ID is present at the switching system 101 or at the services system 102, it can be displayed to a subscriber as part of the calling party identity information (extended format). The information can be delivered as the raw Location ID, and the subscriber can use on-premise equipment (CPE, PC, etc.) to decode it, or the Location ID can be translated to an address (street, city) by the switching system 101 or the services system 102 prior to transmission.

Database Access

The geographic location identifier is accessed in the Database 104 primarily for two service categories:

1—Location Type Services
2—Direction Type Services

For Location services, the Telephone ID or DN is used as a key to query the telephony Database. A query in Standard Query Language (SQL) or any other database Application Programming Interface (API) could be formulated as below.

Select GEOGRAPHIC_LOCATION_ID from location_table where Subscriber_DN = <input_subscriber_DN>;

Translated, this means to provide the Location ID from the telephony Database for the telephone identifier (DN) which has been entered into the system as a query.

For Direction services, a composite query has to be formulated which would first query the Database for the subscriber's geographic location identifier and then use this ID to query for other location identifiers. The following example in SQL is used to demonstrate finding the locations of all establishments offering a specified type of business within an X meter radius:

Select All GEOGRAPHIC_LOCATION_ID from location_table where GEOGRAPHIC_LOCATION in (PI *

(X*(Select GEOGRAPHIC_LOCATION_ID from location_table where

Subscriber_DN = <input_subscriber_DN>)**2)) AND

Business_Type = <input_business_type>

After implementing a system as described herein, other similar queries in SQL or any other database APIs can be formulated for accessing relevant data from the telephony Database 104.

Protocol Encoding

The geographical location identifier for cellular or radio based devices is encoded in the message that is sent by the mobile subscriber's Telephony Device 105.1 to the Switching System 101. The Location ID may be sent in two ways:

1. as a standalone number within the set of numbers transmitted by the mobile subscriber's device 2. as a number that is encoded within the existing set of numbers transmitted by the mobile subscriber's device.

Referring again to FIG. 2, a block diagram of a computing system combined with a telephony/geographical location (GPS, PINS) unit is shown. The computing system also contains several multi-media input and output devices. This system comprises the elements generally found in a personal computer (processor, bus, memory, address and data lines, keyboard, video display, speaker, etc.) and its constituent software elements (operating system, file structure, interrupt server, task execution and control, device drivers, application software, etc.), but it adds several key elements that expand its functions, especially with respect to capturing, delivering, and using the Location ID and telephony capabilities of the present invention. Although the system can be implemented using a personal computer, it may be initially implemented using a less powerful computing system. In general, the User interfaces with the system using the Keyboard/Keypad (KBD) 202 for entering normal alphanumeric text information, the hands-free voice activated Microphone (MIC) 201 for voice information (to modulate for transmission to another connected device) or voice commands (to be interpreted by the device's Function Processor 204 for action), and the Video Display Unit (VDU) 212 which provides a display mechanism for a variety of visual data and touch screen processing capabilities. The Media/Data Card Unit (MCU) 211 provides a bi-directional system for smartcard interfaces (like the AT&T SmartCard) and data card interfaces like (PCMCIA). The Bar Code Reader 214 provides a means for scanning an encoded Location ID, Customer ID, Service Type as noted above, then generating a query to the processor to translate those into a physical location (such a system may then be used to spawn a query to the database (see FIG. 4) which in turn generates directions to aid in delivering a package to any specified location). Together, these interfaces allow the use of data intensive applications stored on the data cards, credit/debit instances, and personalized identification numbers (PINs) to be sent across telephony links in the support of financial transactions (such as purchases, reservations, etc.). Software functions and data processing for any function request occurs in the generalized Function Processor (FP) 204 which runs a small realtime operating system and is responsible for all software execution 205 including, general stored program execution, timer functions (calendar, clock), interrupt handling, resource arbitration, Location ID encoding and/or encrypting from Cartesian Coordinates to binary encoded number(s), voice recognition (speech to text) and generation (text to speech), the Message Processor and Router (MPR) 206 which provides assembly and disassembly, and message routing services of message packets for all devices via the Interrupt Handler, Device Interface and Drivers (DID) 207, etc., and is supported by the device Memory (MEM) 203 ROM/FLASH/EEPROM and RAM which respectively contain executable programs, and read/ writable data (including a history of unit positions, call information, etc.). The Speaker (SPKR) 208 is a simple amplified audio speaker, the Telephone Transceiver (TT) 209 and antenna 209.1 are wired or wireless transceivers and core phone circuits used in the PSTN and radio-based telephony networks to provide modulation/demodulation, tone generation, access, and other generalized telephony features, the Telephone Interface (TI) 210 provides the function of converting data from MPR 206 into a format usable to TT 209 and delivers analog and signalling data across the Telephone Bus 209.2. The GPS/PINS Receiver (GPSR) 213 and associated antenna 213.1 capture the GPS or PINS signals, process them to generate the physical location information, and provide that information via typically a serial data link to MPR 206 and FP 204 for conversion into Location ID.

Figure 2:
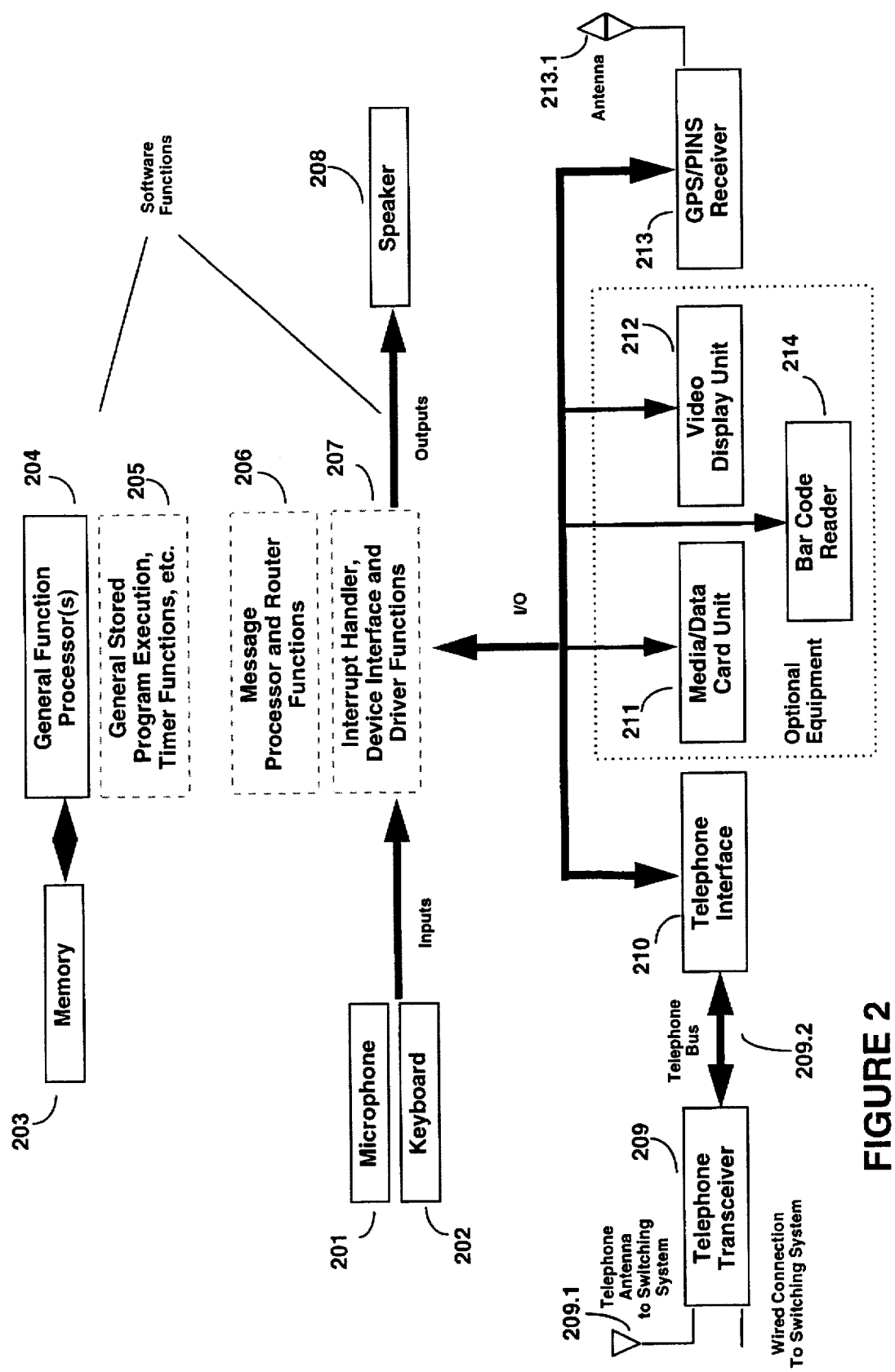
FIG. 2 is a diagrammatic representation of a combined GPS/PINS receiver/telephone device and various interfacing devices for capturing and using the noted Location ID and associated information.

The Unit depicted in FIG. 2 allows for scenarios where a user can query the telephone system as follows. The user speaks the Call command which is captured by MIC 201, or pushes a single or multiple buttons on KBD 202, or touches Video Display Unit (VDU) 212 on a call designator, which in turn is captured by DID 207, which then generates an interrupt and delivers the respective data to MPR 206 where it is interpreted, queued, and processed with FP 204. FP 204 generates a query to MEM 203 or via MPR 206 to GPSR 213 to ascertain geographical position, processes the result into a Location ID, and stores the result in MEM 203. This information is then packaged with the originating call and in-turn routed back out through MPR 206 and DID 207 to TI 210. The TI places the Call query and Location ID into the telephone's in-band control or data format, transfers the data to TT 209 over Telephone Bus 209.2, where TT 209 initiates the actual telephone call or data transaction with the telephone wired or wireless telephone network.

Protocol Encoding Technique

The mobile subscriber's Telephony Device 105.1 can have a built in GPS/PINS or other geographical positioning device (FIG. 2), or one may exist in close proximity that is connected to the mobile subscriber's device via a physical connection or transmission medium using an interface that supports the following messages:

a. Location ID Request
b. Location ID Acknowledge

The mobile subscriber's Telephony Device 105.1 Locator Interface Function, residing in Memory 203 and accessible to Function Processor 204, can query Memory 203 for the formatted Location ID stored position (a likely scenario in the case of automatic periodic position updates) or send a Location ID Request to GPS/PINS Receiver 213 or other geographical positioning device for the raw data. That device responds by sending the Geographical Location Identifier in the Location ID Acknowledge message back through Device Interface and Drivers 207 to Message Processor and Router 206, and to Function Processor 204. The geographical positioning device may acquire the Geographical Location Identifier after it has received a Location ID Request, or it can periodically or continuously acquire the Geographical Location Identifier, store it in its own buffer, or route it back to Function Processor 204 for Location ID formatting and subsequent storage in system Memory 203. Regardless, GPS/PINS Receiver 213 upon the receipt of a Location ID Request message replies by fetching the most recent data stored in its buffer and placing it in the Location ID Acknowledge message. After acquiring the geographical position information from the geographical positioning device, encrypting, formatting and storing it, when the Timer function or call interrupt function executes, Function Processor 204 fetches the Location ID, routes the data to Message Processor and Router 206, which in turn assembles the message packet for Telephone Interface 210 via Device Interface and Driver 207, which encodes the message in one of the two fashions described above and then transmits the data to the relevant Switching System via Telephone Transceiver 209.

Making reference to FIGS. 4A-4D, the operational steps for a locator service, and extensions for call placement and receipt of directions, is shown. Generally, a subscriber to the locator service offered by some business enterprise (a Local Exchange Carrier (LEC), Telephone Company (TELCO), service bureau, etc.) dials (via DTMF, hands free dialing, computer, or PDA) the locator service's phone number at step 400. The subscriber's call is validated at step 401 by the Switching System. Validation covers several different types. For voice recognition, a PIN is entered by the subscriber. Alternately, the Switching System simply uses the ANI/CLI of the telephone to determine the validity of the subscriber by database classmark match. If this validation check fails at step 402 the call is directed to an announcement machine at step 41 which plays an invalid caller message and then the call is disconnected normally at step 42 by the Switching System. However, if the subscriber is affirmatively validated, the Switching System proceeds to determine the type of device at step 403 the user is using to communicate to the Switching System by making a query to the subtended Database where service and equipage information is maintained. The Switching System could, for example, ascertain that the user has an ADSI equipped device which would enable the switching system to use CPE Alerting Signal (CAS) and DTMF as specified in FR-NWT-000012 ADSI Family of Requirements for communicating back and forth. Standard analog telephony lines or cellular telephony device types perform all service interactions with the user via voice, DTMF, or voice and DTMF. Modem device types perform service interaction using standard data packets. Standard ADSI display phones and like devices are also supported by the service, using ADSI defined FSK on outbound (to the subscriber device) signals and DTMF on inbound (to the Switching System) communications. The default communication mode between the Switching System and subscriber can be set to voice, DTMF, data, or ADSI. After the system has determined the type of device, the user is presented with a request to enter a location query at step 404. In the present example, this could be a voice announcement and an ADSI signal which causes the device to display a prompt like: Your starting point is from: <your phone number> <your address>. Please enter the 10 digit phone number of your destination: _ _ _ _ _ _ _ _ _ _.

Using the above described devices the user formulates the location query in the appropriate manner at step 405, in this case by depressing the keypad digits. The location query is collected at step 406 by the Services System and it performs some intermediary (syntax) checks. If the syntax checks fail, the Services System asks the user to enter the query again. Once the query is validated, the Services System validates at step 408 the semantics of the query, and determines whether the query has any merit. The Switching System, as part of the query sends the Services Systems the DN of the user and the contents of the query. If the validation at step 409 of the query fails, the Services System asks the user to enter the query again. However, if this is the nth time (configurable system parameter) the user has entered an incorrect location query in the same session at step 412, the Services System sends the Disconnect Message to the Switching System at step 413 and the Switching System plays the disconnect announcement at step 41 and disconnect the call at step 42.

The Services System determines the reference point for the location query by following the linkage of the DN to the geographical location identifier. However, the user's DN can be superceded (in this example by overtyping the source DN <your phone number>) if the user wishes to find locations relative to a location that the user is not present in. For example, the service could be used to locate restaurants in downtown Chicago in an n-sized radius from the DN at 1000 ABC Street, Chicago. The Services System formulates the database query at step 410 similar to the queries described above. This query is then processed against the telephony location Database at step 411. The Database System at step 414 retrieves all geographical Location IDs from the database that satisfy the query criteria. Depending on the Database schema, the address, DN and other information about the geographical Location IDs that fit the query criteria can be either retrieved from the same database, or using the geographical Location ID as an index into the administrative or address database, the address and other pertinent information can be retrieved. Such Services Systems and Database Systems are old and well known in the Telephone Central Office and Database industries. The retrieved information is then packaged into a message at step 415 by the Database System response functions and transmitted to the Services System at step 416. This transmission is either over an SS#7 signalling interface or via a computer based protocol such as TCP/IP, X.25, SNA etc. Depending on the amount of information retrieved by the Database Software the message can be either a set of packets of information or a single message which encapsulates the entire information content. The Services System processes the result from the Database System by packaging the information into messages that are applicable to the users device type at step 417, in this case, for example, by building an ADSI message, and transmits them to the Switching System. Whereas for a voice response, for example, the Services System may ask the Switching System to connect the call to an announcement machine and instruct the announcement machine to use text to speech resources to play the query response back to the user. Nevertheless, the Switching System processes whatever message is sent from the Services System at step 418 and transmits it at step 419 in the format (in this example ADSI) appropriate for the user's device. The user after hearing or viewing the response to his query has the option of composing another query or disconnecting from the service. Specifically, the user is queried at step 420 by the system to see if he would like to place a call to the location specified or get directions at step 425 to the specified location. If the user chooses to place a call at step 421, by pressing the Key referenced in the message, e.g., # key, the Services System performs a lookup of the location's phone number by making reference to the Location ID in the Database. Then, the Services System signals the Switching System to make the call at step 423 and awaits notification at step 424 by the Switching System of call completion and disconnection (to the location). At that time, the original service will continue by offering the subscriber directions to the location at step 425, which if desired, at step 426 the Services System performs a Location ID to address mapping by searching the Database for a street reference at step 427. Upon obtaining the street reference and making a database access to ascertain the calling subscriber's location and street address, the Services System performs a routing analysis at step 428 to develop a street route from the calling subscriber's location to the desired location. After developing the route, the Services System delivers at step 429 the information to the subscriber in the designated device type's communication format and then proceeds to disconnect the call normally. The location ID to address mapping Software and the routing analysis Software are old and well known.

Figure 5B:
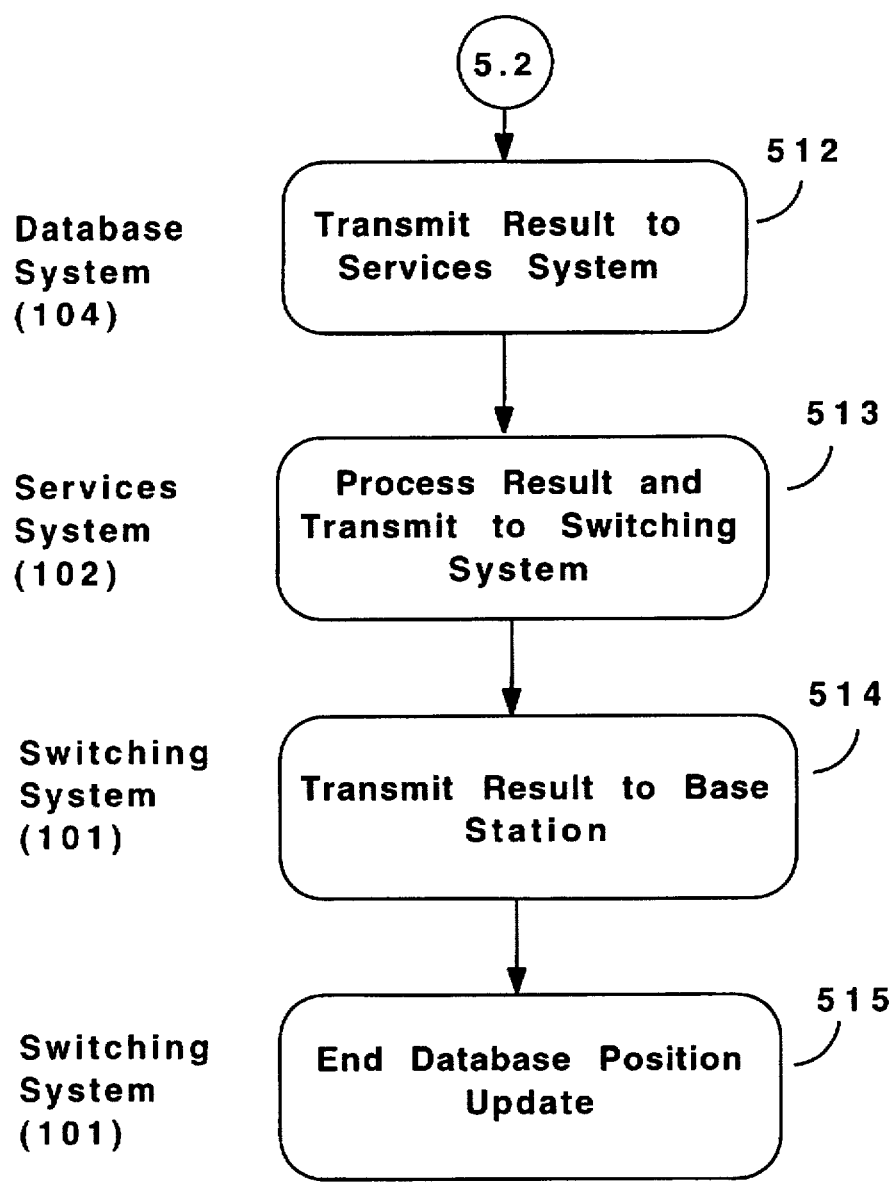

Making reference to FIGS. 5 and 5B, the operational steps are shown for updating the geographical data within the confines of the PSTN by use of cellular or other radio based interfacing devices (refer to FIG. 2) having a subtended geographical position determining device. The Mobile Telephony Device 105.1 receives a GPS/PINS Signal 500 using the GPS/PINS Receiver 213 and begins to process the signal 501 by sending the raw data as formatted by the GPS/PINS receiver into longitude/latitude degrees, minutes, seconds thru the Device Interface and Drivers 207 to the Message Processor and Router 206 which notifies the Function Processor 204 of the input and prompts the Locator Interface Function in Memory 203 to perform the conversion to Location ID format. After storing the result in Memory for future reference, when the Timer Function or a Call Function has initiated the interrupt servicing to include Location ID in an MS data packet, the Function Processor 204 fetches the latest Location ID, ships it to the Message Processor and Router 206 for inclusion into the MS data packet 502. After the data packet is assembled, it is passed thru the Device Interface and Drivers 207 to the Telephone Interface 210 where the MS data packet is prepared for Telephone Transceiver 209 transmission 503 by placing it into the in-band control signal. Since the Timer Function in Memory runs periodically, the transmission of this data can be on a timed or interrupt basis. After the Telephone Transceiver transmits the data packet, the Base Station 103 receives the information 504, sets up a Signalling Link 110 and sends 505 the data to the Switching System 101 where the data packet is received 506 and translated into a Database 104 update packet 507. The Switching System then sets up a Signalling Link 110 to the Services System and sends it the update 508, or in the case of a direct Database connection and as a subsequent step from the Services System 102 formulates the Database update 509 and sends it to the Database 510. Upon receipt and syntactical validation of the input, the Database processes the update 511 by updating the relevant subscriber device record. After completing the update activity the Database passes a result back to the Services System 512 (FIG. 5) for Home Location Register updating and Visitor Location Register updating via the currently used methods and which may resend the message in case of error or merely notify 513 the Switching System 102 and 514 the Base Station 103.

Figure 6:
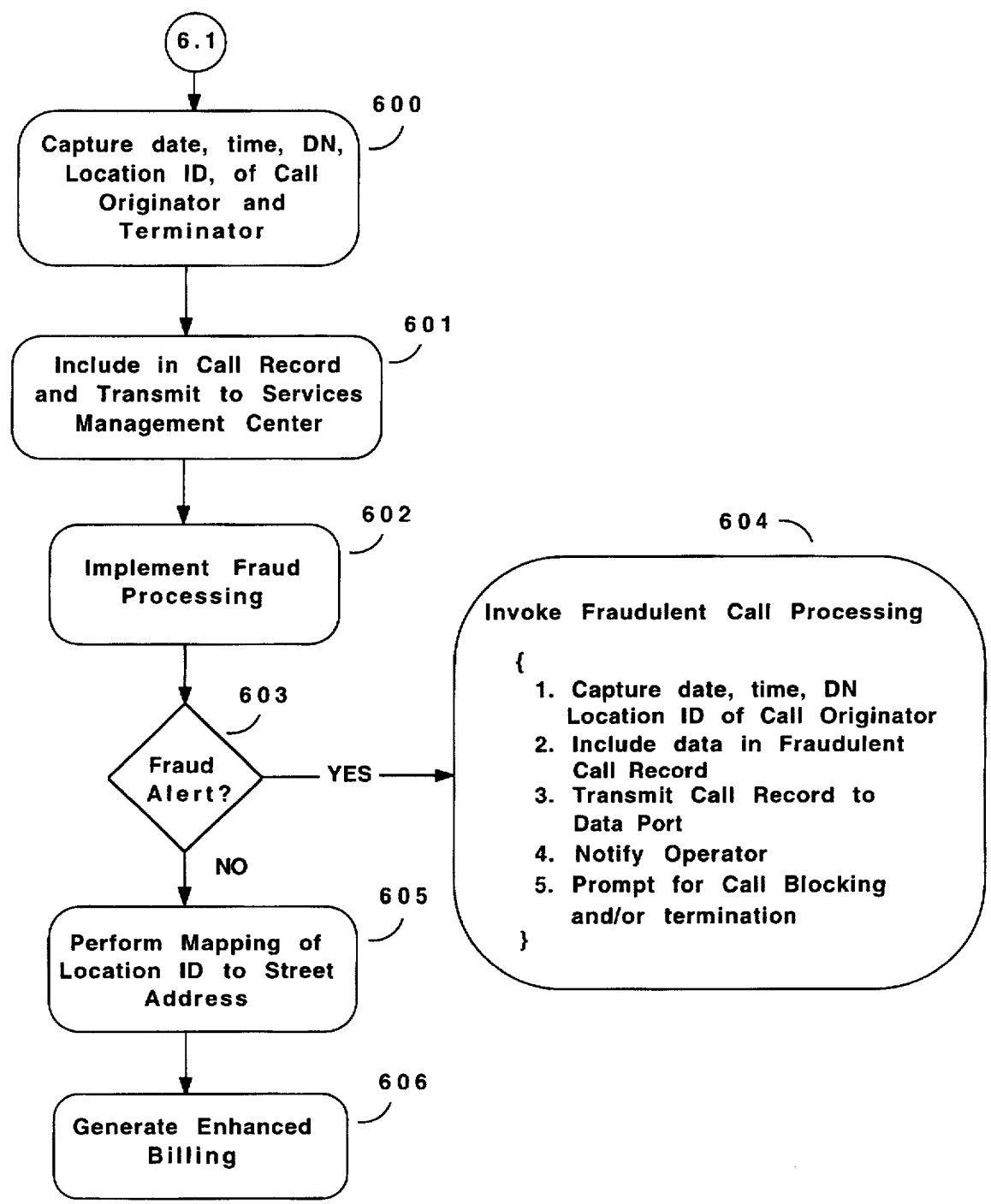
FIG. 6 is a flowchart of the operational steps in performing enhanced billing services and enhanced fraud protection services for radio based telephony systems/devices.

Making reference to FIG. 6, the operational steps in performing enhanced billing services and enhanced fraud protection services for radio based telephony systems/devices are shown. The benefits of the inclusion of geographical Location ID in telephony applications can also be applied to billing. Currently, billing records contain the dialed number as the only means of identifying the called party, or in the case of a collect call, the calling party. The dialed number is not the most informative way of identifying a caller, especially when the caller or the called party is a cellular user who is not in his/her home location. Merging the Location ID, in the BAF (Bellcore AMA Format) or EBAF (Extended Bellcore AMA Format), aids in the exact location of the called party and/or the calling party. During the billing statement processing at the billing center, the Location ID can be used as a key into the location database to determine the street address of the caller and calling parties. As shown in FIG. 6, the caller's and called parties Location ID 600 is stored in the billing record that is generated by the switching system (101) or by the Services System 102. Then the raw billing records are transferred 601 to the billing center (usually) co-located in the Service Management System 113 and, in the absence of fraud processing 602 and fraud alert 603, the Location ID is mapped to the street address, city and state 605. Thus, when the billing statement is generated 606, the additional data provided by the Location ID/DN reference provides enhanced information to both the service provider and customer.

Fraud can be detected at two locations—the VLR 102 and at the Service Management System 113. At the VLR 102, fraud may be detected on a per call basis. The Location ID that is sent by the cellular subscriber is stored and compared with the incoming or new Location ID. Depending on the empirical distance between the two Location IDs and the time it took for the mobile subscriber to move from one location to the other, denoted by the Location ID, the fraud control process 602 uses a thresholding algorithm to determine whether the call is fraudulent. Such an algorithm flags instances where a mobile subscriber has moved a distance that is physically impossible to move in the given time. If the call is flagged as fraudulent 603, the fraudulent call processing software is invoked 604. The date, time, DN, and Location ID of the calling party are captured and included in a fraudulent call record. This data is then transmitted to a data port on the system and an operator 113 or the Switching System 101 is notified to block calls to and from the mobile subscriber or route them to an operator for some other action. Similar, techniques can be used in the HLR 102 and other Service Systems 102 components to detect fraud on a per call basis.

At the Service Management 113 location, fraud is detected in an off-line manner. Here, call records, are used to process information pertaining to fraud. Once call records are transmitted to the Services Management System 113, a fraud processing algorithm 602 is executed. This fraud detection mechanism can also reside in the Services System 102 in which case the call records are transmitted 601 to the Services System 102 in parallel to the Service Management System 113. However, in this description we assume that the fraud detection system is co-located in the Service Management System 113. The Fraud detection algorithm uses the Location ID to determine trends in a subscribers calling pattern. These trends are then matched with the subscribers general calling pattern to identify anomalies. For example, a caller, normally goes to work at 8:00 am and normally uses a specific route, but suddenly calls are being made at 4:00 am, from areas that the caller rarely or never visits will trigger a fraudulent call alert. If anomalies of this type are detected 602, the fraud process alerts 603 either the OAM&P system 113 or sends a message to the Switching 101 or Services System 102 to block calls 604.

Figure 7:
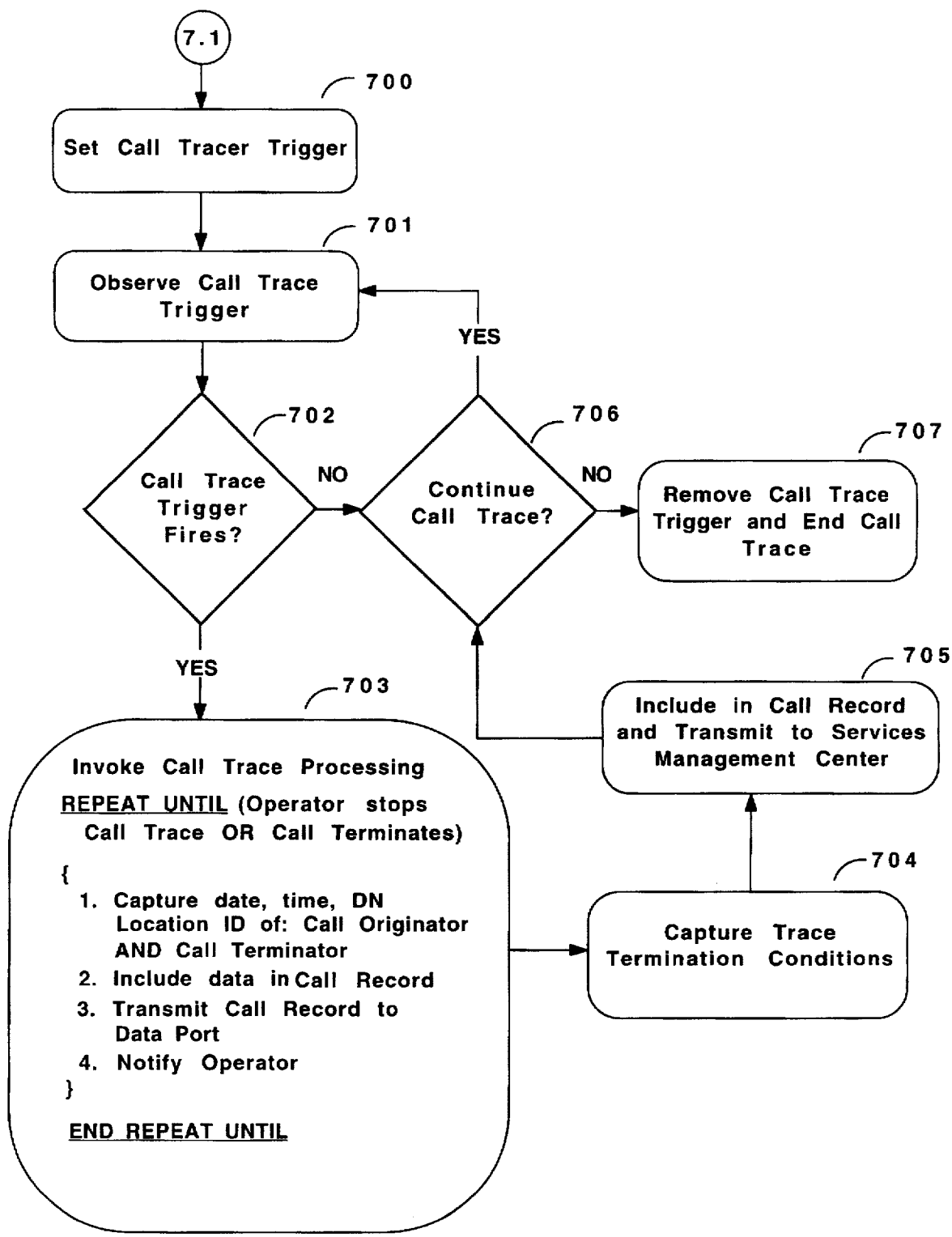
FIG. 7 is a flowchart of the operational steps in providing advanced roaming call trace for both the originating and terminating ends of any particular telephony call by reference to DN (originating or terminating) and by use of the Location ID.

Making reference to FIG. 7, the operational steps in providing advanced roaming call trace are shown for both the originating and terminating ends of any particular telephony call by reference to DN (originating or terminating) and by use of the Location ID. Via the Service Management System 113, Services System 102, or Switching System 101, the telephony system provider, at the request of some outside agency (law enforcement) sets a call trace trigger 700 in the Switching System 101 or Services System 102 based upon one or more of several criteria:

1. Call from a designated DN
2. Call to a designated DN
3. Call from a designated Location ID
4. Call to a designated Location ID
5. Date/time parameters
6. Call type After setting the designated call trace trigger 700, the operator invokes call trace observation software 701 which performs a comparative analysis on each processed call for a match against the criteria given above. If the call trace trigger fires 702 by a call meeting the conditions (there may simultaneously be multiple call trace triggers), call trace processing software is invoked 703. The call trace processing proceeds in a looping condition based upon an interrupt (receipt of a new in-band control signal from any one of the telephony devices) or timed basis (periodically polling the location registers (HLR, VLR), Switching System or Services System to determine any change in call status) until the telephony system provider's operator terminates the trace condition or the call is terminated (ended). Processing steps include capturing the date, time, DN, and Location ID of both originating and terminating parties; posting that data into a specialized call trace data record; transmitting the call record to a data port on the Service Management System 113, Switching System 101, or Services System 102; and notifying the telephony system provider's operator by sending a message to the local operator's console. When the trace terminates 704, the trace data taken during processing 703 and the termination conditions are captured and sent in the call trace record 705 to the Service Management System 113 for future reference. Additional post-termination information about the call may be gleaned by a data request to the Switching System 101, or Services System 102, or Service Management System 113 which retrieves the billing record for the call. When all call trace activities are to be terminated (based upon operator or timed decision), the call trace trigger is removed and the trace software no longer executes 707.

Figure 8:
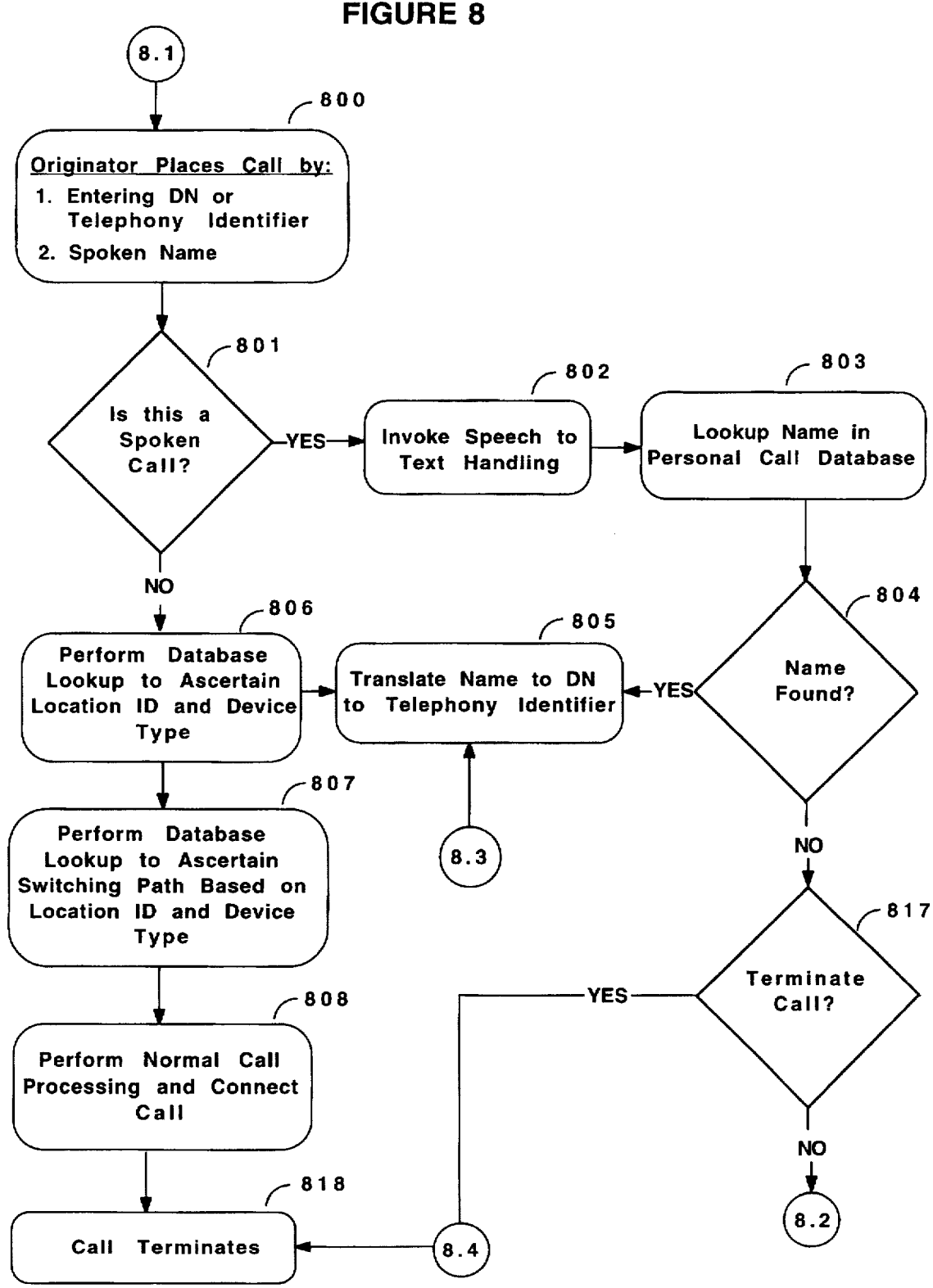
FIGS. 8 and 8B are flowcharts of the operational steps in providing call routing (including follow-me calling services) by translation of a telephony identifier, DN, or spoken name and by making reference to the Location ID.
Figure 8B:
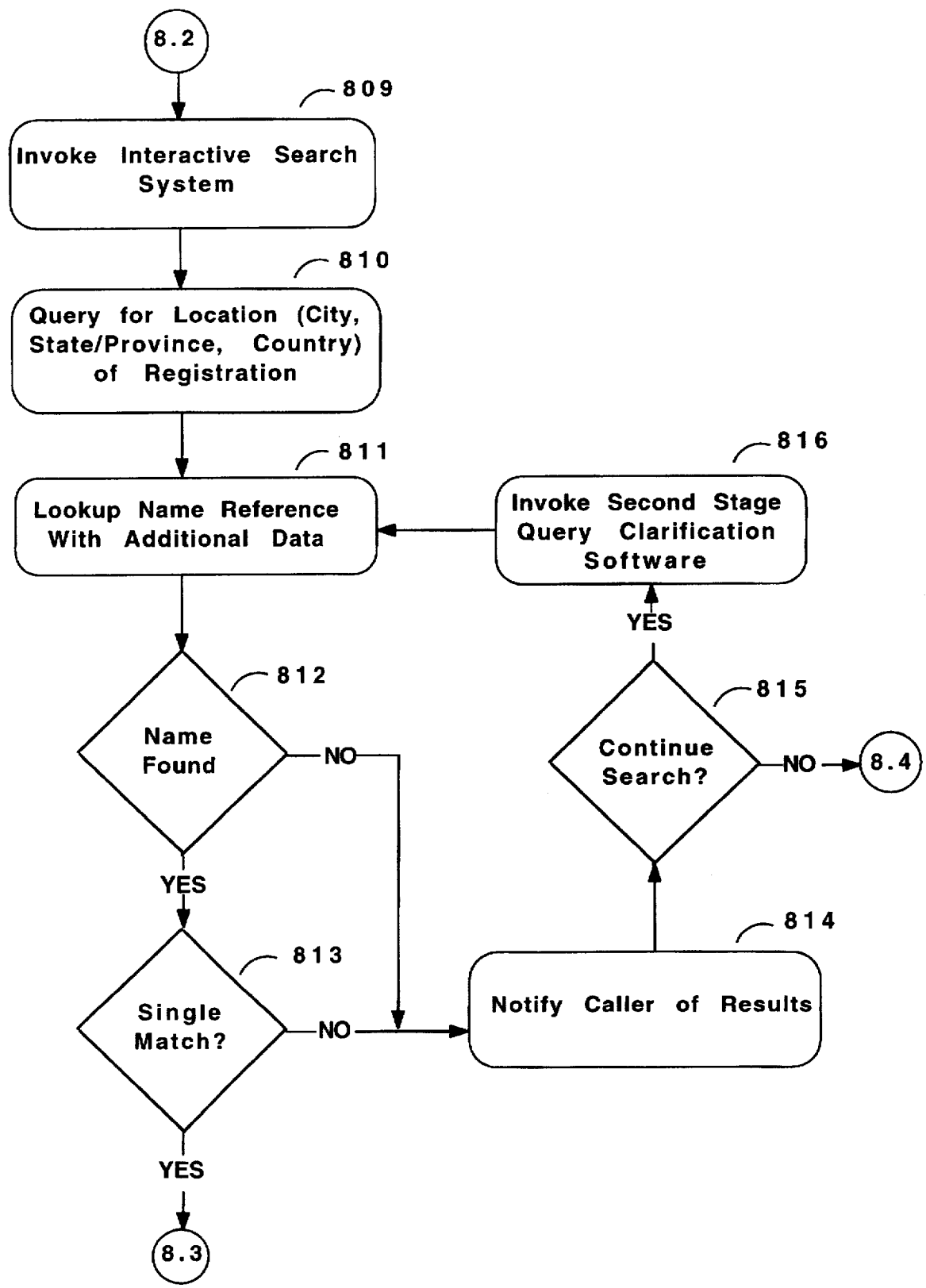

Making reference to FIGS. 8 and 8B, the operational steps are shown for providing call routing by translation of a telephony identifier, DN, or spoken name by making reference to the Location ID. The originator places a call to a specified terminating party by entering in the normally prescribed fashion digits which identify the party or speaks (for a subscriber to calling name service) the name (or other identifier) of the party 800. The terminating switch 101 determines if this is a Spoken name or normal digit call 801. In the case of a spoken name call, the switching system 101, via a service class mark or equivalent, invokes a speech to text (SPOT) interactive voice response unit (IVRU) system 802 located at the switch or at a services system 102. The SPOT is a very complex system and is not intended to be fully described in this document. However, a general statement about its functions is given below for clarification. The SPOT captures the spoken name, translates the name to a text string, and performs a lookup of the name in the calling party's localized calling name database 803. If the name is found 804, it translates the name association to a DN 805 by database reference 104 and prepares to perform the normal DN—device type, Location ID lookup 806. If the name is not found the caller is queried to see if they wish to continue or terminate the call 817. If the caller elects to continue to refine the search, the system invokes additional search software 809 (FIG. 8) which queries for the home registration location (city, state/province, country) of the terminating party 810. This data (again translated from speech to text), allows the system to perform a database query to find the name reference with the additional data 811. If the name is not found 812 or a multiple match condition is found 813, the caller is notified of the results 814, queried to continue 815, and if yes, the system tries to clarify the original request. The clarification comprises providing a list of the matches found and querying for user selection, or playing back in alpha digit stream (example: 'M', 'T', 'K', 'E') the spelling of the name captured to see if it matches the user's intent. Clarification processing can continue until the caller elects to discontinue the search 815.

Returning now to the point where a single match has been found and translated to a DN or telephony identifier, the switching system 101 or services system 102 makes a query 806 to the database 104 based upon the identifier to ascertain the device type (wired, wireless, etc.) and the current Location ID for the desired termination device. Once this query is completed, a second query to a Location ID to numbering and routing plan database 104 is made by passing Location ID and DN which specifies the routing method for the call by pinpointing the country code, area code, and in the case of a mobile device the dynamically assigned local visitor number or for a wired device the normally assigned local number. After this point, the switching system constructs the digit stream for the call and routing of the call proceeds normally by the PSTN 808 until call termination 818. This method allows the implementation of a ubiquitous follow-me calling service by knowing and associating the telephone identifier and then associating the Location ID with the PSTN's call routing scheme.

Thus the present invention provides a novel arrangement for storage, transmission, communication and access to geographical positioning data that is linked with standard telephony numbering and is encoded for use in telecommunications and related services such as: user access to GPS location data for a selected directory number; user access to routing instructions to a selected directory number; user updating of his current GPS location identifier, GPS based telephone call billing, GPS based telephone call fraud detection, GPS based roaming call trace and GPS based follow me calling service.

It will be obvious to those skilled in the art that numerous modifications of the present invention could be made without departing from the scope of the invention which shall be limited only by the scope of the claims appended hereto.

What is claimed is:

1. A telecommunication system for use with a plurality of user devices operated to receive global positioning system (GPS) location identifier signals representative of the current location of the user device and operated to periodically transmit such GPS location identifier signals to said telecommunication system and operated to transmit a querried user device directory number to said telecommunication system when operating as a querrying user device, said telecommunication system also being for use with a plurality of user devices not operated to receive GPS location identifier signals, said telecommunication system comprising:

data storage means operated to store a plurality of predetermined directory numbers, each associated with a particular user device, and further operated to store a GPS location identifier associated with the directory number of the user device transmitting the corresponding GPS location identifier signal, and further operated to store a predetermined location identifier associated the directory number of each of a plurality of user devices that do not transmit GPS location identifier signals;

data processing means connected between said data storage means and said user devices;

said data processing means being operated in response to said querried directory number to retrieve the location identifier of said querried directory number, from said storage means and transmit it to said querrying user device.

2. A telecommunication system as claimed in claim 1, wherein said data processing means is further operated in response to said querried directory number to retrieve the location identifier of said querrying directory number from said storage means, determine geographical routing instructions from the location defined by the location identifier of said querrying directory number to the location defined by the location identifier of said querried directory number, and transmit said routing instructions to said querrying user device.

3. A telecommunication system as claimed in claim 1, wherein said data processing means is further operated to transmit a call connection prompt message to said querrying user device;
    said user device being further operated in response to said call connection prompt message to transmit a call connection request to said data processing means; and
    said data processing means being further operated in response to said call connection request to connect said querrying user device to said querried user device.

4. A telecommunication system as claimed in claim 1, for use with said user devices which are further operated to transmit a call connection request and the directory number of a called user device to said data processing means when operating as a calling user device wherein:
    said data processing means is further operated in response to said call connection request and said called directory number to connect said calling user device to said called user device and generate a record associated with said connection and the location identifier of said calling user device.

5. A telecommunication system as claimed in claim 4 wherein an operator terminal is connected to said data processing means, said operator terminal being operated to transmit a call trace trigger to said data processing means, said data processing means being further operated in response to said call trace trigger to retrieve the current location identifier of said called and said calling user device, from said storage means and store them in said storage means as traced called and traced calling location identifiers, respectively.

6. A telecommunication system as claimed in claim 5, wherein an operator terminal is connected to said data processing means, and said data processing means is further operated in response to said call trace trigger to transfer said location identifier to said operator terminal.

7. A telecommunication system as claimed in claim 4 wherein said data processing means is further operated in response to said called user device directory number and the current location identifier of said called user device to determine the call routing path from said calling user device to said called user device.

8. A telecommunication system as claimed in claim 1 wherein said data processing means is periodically operated to generate a predetermined range of valid locations associated with the current location identifier of certain user devices, and said data processing means is further periodically operated to compare said current location identifier to said predetermined range of valid locations and generate a fraud alert signal when said current location identifier is not within said predetermined range.

9. A telecommunication system as claimed in claim 8, wherein an operator terminal is connected to said data processing means, said data processing means being further operated in response to said current location identifier being outside said predetermined range to transfer said location identifier to said operator terminal.

* * * * *